(12) United States Patent
Fazeny et al.

(10) Patent No.: US 9,815,143 B2
(45) Date of Patent: Nov. 14, 2017

(54) METHOD, DEVICE, AND LASER PLOTTER FOR THE PROCESSING OF WORKPIECES

(71) Applicant: Trotec Laser GmbH, Wels (AT)

(72) Inventors: Stephan Fazeny, Gmunden (AT); Kurt Blumenschein, Leonstein (AT)

(73) Assignee: Trotec Laser GmbH (AT)

( * ) Notice: Subject to any disclaimer, the term of this patent is extended or adjusted under 35 U.S.C. 154(b) by 203 days.

(21) Appl. No.: 14/708,815

(22) Filed: May 11, 2015

(65) Prior Publication Data

US 2015/0360323 A1 Dec. 17, 2015

(30) Foreign Application Priority Data

May 19, 2014 (AT) .............................. A 50353/2014

(51) Int. Cl.

| B23K 26/38 | (2014.01) |
|---|---|
| B23K 26/42 | (2006.01) |
| B23K 26/02 | (2014.01) |
| B23K 26/04 | (2014.01) |
| B26D 5/00 | (2006.01) |
| B26F 1/38 | (2006.01) |

(52) U.S. Cl.
CPC .............. *B23K 26/38* (2013.01); *B23K 26/02* (2013.01); *B26D 5/005* (2013.01); *B26D 5/007* (2013.01); *B26F 1/3813* (2013.01); *B26D 2005/002* (2013.01)

(58) Field of Classification Search
CPC ........ B23K 26/38; B23K 26/02; B23K 26/04; B23K 26/30

USPC .............. 219/121.6, 121.82, 121.85, 121.67, 219/121.72, 121.83; 347/224, 248
See application file for complete search history.

(56) References Cited

U.S. PATENT DOCUMENTS

| 6,531,682 B1 | 3/2003 | Guttler |
|---|---|---|
| 6,619,167 B2 | 9/2003 | Mikkelsen et al. |
| 6,619,168 B2 | 9/2003 | Alsten et al. |
| 6,672,187 B2 | 1/2004 | Alsten et al. |
| 6,772,661 B1 | 8/2004 | Mikkelsen et al. |

(Continued)

FOREIGN PATENT DOCUMENTS

| EP | 1577048 A1 | 9/2005 | |
|---|---|---|---|
| GB | 1447490 A * | 8/1976 | ........... G01B 11/022 |

(Continued)

*Primary Examiner* — Samuel M Heinrich
(74) *Attorney, Agent, or Firm* — Lerner, David, Littenberg, Krumholz & Mentlik, LLP

(57) ABSTRACT

A laser plotter, a device and a method for cutting of a graphic is disclosed. The method may comprise preparation or loading of a processing job with a graphic and identification features at a display; application of the recognition features and of the graphic to the workpiece; arrangement of the workpiece in a processing area of a laser plotter; acquisition or detection of identification features in order to determine the position and alignment of the applied graphic in the processing area; carrying out the processing after successful identification of the graphic; after the insertion of the workpiece, a laser-pointer is positioned on any selected identification feature, whereupon, a processing image represented on a display element, with the identification feature, is moved at the display element in such a way that a laser position displayed at the display element coincides with the identification feature.

25 Claims, 8 Drawing Sheets

(56) References Cited

U.S. PATENT DOCUMENTS

Figure 1:
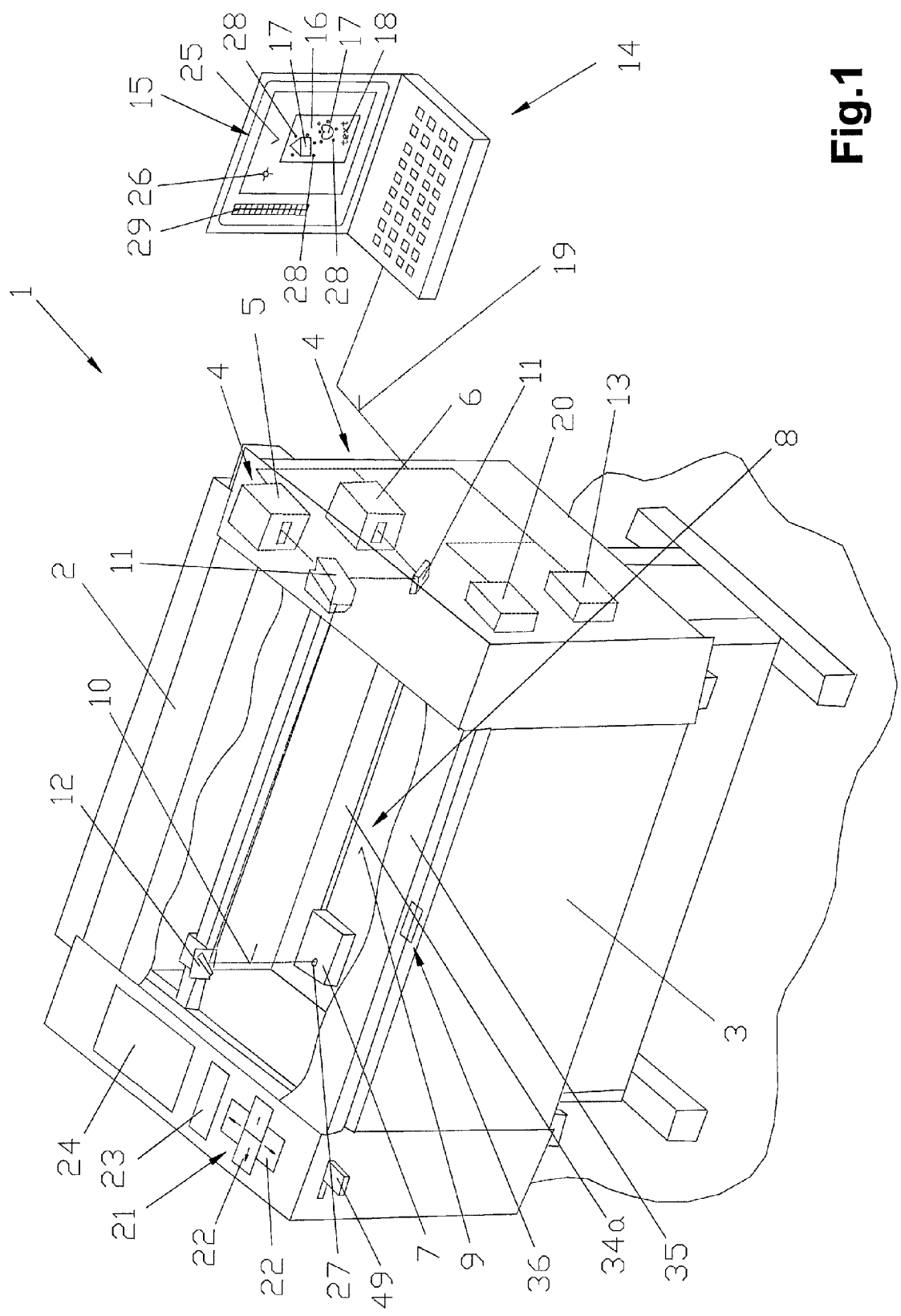

| | | | |
|---|---|---|---|
| 2002/0144578 A1* | 10/2002 | Mikkelsen | B26D 5/00 83/13 |
| 2002/0190230 A1* | 12/2002 | Dworkowski | B23K 26/048 250/559.38 |
| 2004/0040943 A1* | 3/2004 | Lundberg | B23K 26/10 219/121.68 |
| 2005/0205537 A1 | 9/2005 | Penz et al. | |
| 2009/0086199 A1* | 4/2009 | Troy | G01C 1/04 356/251 |
| 2011/0008618 A1* | 1/2011 | Weedlun | B44C 1/105 428/343 |
| 2011/0108531 A1* | 5/2011 | Stokes | B23K 26/364 219/121.69 |

FOREIGN PATENT DOCUMENTS

| | | |
|---|---|---|
| JP | 2011230178 A | 11/2011 |
| WO | 99/38643 A1 | 8/1999 |

* cited by examiner

METHOD, DEVICE, AND LASER PLOTTER FOR THE PROCESSING OF WORKPIECES

The invention relates to a method for the processing of workpieces, a device for carrying out the method, and a laser plotter.

From the prior art, in particular U.S. Pat. No. 6,619,167 A, U.S. Pat. No. 6,619,168 A, U.S. Pat. No. 6,672,187 A, and U.S. Pat. No. 6,772,661 A, systems are already known with which a graphic printed onto a plate or workpiece is cut out. In this situation, first a processing job with a graphic or a graphic region respectively and with register marks is produced and/or loaded on a display element, in particular a computer. Next, the graphic and the register mark are printed onto a workpiece, whereupon the workpiece is positioned in a processing area of a processing device, in particular a laser plotter with an optics unit for the acquisition of the register marks. After the processing process has been started, an acquisition or detection respectively of the workpiece takes place, in particular of the register marks, in order to determine the position and alignment of the workpiece, in particular of the graphic or the graphic area applied, in the processing area of the laser plotter, whereupon the processing process is carried out for cutting out the graphic.

A disadvantage with the documents referred to above is that the positioning for the first time of the workpiece and the device at the display element, in particular at the computer, is relatively laborious for the user.

The object of the invention lies in creating a method, a device for carrying out the method, and a laser plotter, with which the handling, in particular the positioning, of the workpiece is substantially improved. A further object is to obviate as far as possible the disadvantages of the prior art.

The object of the invention is solved by a method in such a way that, after the insertion of the workpiece in the processing area, a laser-pointer of the laser is positioned on any desired identification feature, whereupon a processing image, represented on a display element, of the graphic or of the graphic area respectively, together with the identification feature belonging to it, is moved on the display element in such a way that a laser position represented on the display element coincides with the identification feature marked by the laser-pointer.

Advantageous in this situation is the fact that, as a result, the positioning of the workpiece for the first time in the laser plotter is made substantially easier, since the user defines the workpiece, or places it as may be desired into the laser plotter, and can then move the laser-pointer onto any desired position of an identification feature, wherein the exact position of the laser-pointer or of the laser respectively is then easily displayed to the user on the display element, and he can move the graphic. A further advantage lies in the fact that this allows for a very rapid positioning, such that the most widely differing processing jobs can be easily handled one after another. This also allows for any desired arrangement in the processing area of the laser plotter, since a simple and, in particular, rapid allocation of the position can be carried out. This is also of advantage if the size of the graphic does not accord with the size of the workpiece, and if the graphic was printed, for example, centered with white edges, but the exact size of these edges is not known to the user. Thanks to the use of the laser-pointer in the processing area, the user is able to identify the exact position and align this accordingly, while with the prior art, by contrast, the user was obliged, during the positioning, to keep looking alternately, via the optics element, at the display elements and the processing area, in order to position the optics unit by way of an identification feature, in order for a start point to be determined.

By way of a procedure in which one or more identification features are formed by register marks and/or graphic elements and/or workpiece elements, wherein the register marks are additionally applied, while by contrast the graphic elements and/or workpiece elements are selected and determined from the graphic or the graphic area respectively, or from the represented workpiece, the situation is advantageously reached in that the user can make a selection from different identification features. In this situation it is possible, for example, that workpieces with drill holes can also be easily aligned, and these drill holes used as identification features, or special milling areas or formations are arranged at the workpiece and can be used.

Also of advantage is a procedure with which the adjustment movement of the laser-pointer takes place directly at the laser plotter by way of input means, in particular a button, wherein the laser position at the display element is constantly updated, or, after the adjustment procedure, by activation of an input means, the new laser position is transferred to the display element and changed at the display element, as a result of which settings can be efficiently made directly at the device; i.e. the user, with an ideal view onto the workpiece, can move the carriage of the laser plotter and therefore position it exactly on the graphic. This allows for the positioning to be carried out without the display element or the computer.

It is of advantage that, for the recognition of the identification feature marked with the laser pointer, an auto-correction is carried out, during which the optics unit is positioned by way of this identification feature, since the readily visible laser-pointer can be easily moved over the desired position, while with methods of the prior art, with the camera, it would be necessary to keep looking alternately at the material (current position) and the monitor (current image).

With the procedure with which, in order to carry out the auto-correction, an adjustment path is traveled over between the laser-pointer and the optics unit, in particular a center of the optics unit, the situation is advantageously achieved that this can be efficiently detected in the pre-field and deposited in the device.

By means of the procedure that, for the recognition of an identification feature, the laser plotter moves the optics unit to the specified position in such a way that the identification feature is arranged inside a definable search window of the optics unit, the situation is advantageously reached that the first pass mark, in particular an identification feature, can with high probability already be successfully found. This also achieves the situation that, because of the size of the search window of the optics unit, corresponding deviations from the specified position are possible, without thereby a stop of the processing process, or an automatic search process for finding the identification feature, being started.

Also of advantage are procedures with which, at the recognition of an identification feature inside the search window of the optics unit, the optics unit and the laser or laser beam respectively which are coupled to it are moved in such a way that the identification feature is positioned in the center of the search window, or that, on recognition of the identification feature inside the search window, the position of the identification feature to the center of the search window or to a starting position allocated to the search window, since in this way the measurement precision is increased and changing focus positions or even different focal lengths have only a slight influence on the precision of the measurement. As long as the size of the actual viewing field deviates by less than a factor of 2 from the adjusted size of the viewing field, this method converges in linear fashion, and thereby brings the pass mark in just a few steps into the center of the viewing field.

In this situation, procedures are of advantage with which a defined number of centering attempts for centering the identification feature in the search window are specified, wherein the processing process is thereafter stopped, and can be continued manually, since, as a result of this, for example in the event of reflections, the situation can be prevented in which the attempts to center the identification feature continue for too long. The user can then engage more rapidly in the processing process.

With procedures in which, in the event of non-recognition of an identification feature, by actuating an input means at the laser plotter or by activation of a button on the display element, the identification feature which has not been identified is jumped over, and the search procedure is continued with the next determined identification feature, or the corresponding identification feature concerned is set at the laser plotter, whereupon the processing process is continued, the situation is advantageously reached in that a workpiece with a partially damaged identification feature, in particular pass marks, or misprints, etc. can likewise be used.

Procedures are also of advantage, however, with which, in the event of non-recognition of an identification feature and, following this, stopping of the processing process, an error correction of the laser position takes place at the laser plotter by actuation of input means, wherein the relative position of the laser position to the graphic or to the graphic area respectively and/or the identification feature is displayed at the display element, since thereby the user at the plotter can nevertheless see where he stands, after the insertion of the material, in particular of the workpiece.

Of advantage is a procedure with which, after the recognition of the identification feature, corresponding images are deposited or stored, which, by corresponding selection or movement with a mouse, can be called up and displayed on the display element, since in this way, in the event of an error (current pass mark not found), it is a simple matter for the previously identified pass marks to be validated once again manually.

The object of the invention is further solved by a method with which, after the ending of the processing process, the workpiece is removed from the processing area and, if appropriate, a new workpiece is inserted, whereupon, by activation of an input means at the laser plotter or automatically by closing a protective cover for the processing area at the laser plotter, a new processing process is started.

It is advantageous in this situation that thereby the downtimes of the device are minimized and the user need only carry out the unavoidable step of the material change, i.e. the insertion of a new workpiece, but otherwise no interaction is necessary, in particular no input at the display device.

Of advantage is the procedure with which, on the activation of a new processing process directly at the processing device, in the event of non-recognition of the first identification feature (28), the processing process is stopped, since this ensures that only an automated processing will then be carried out if new material is actually inserted and this has been identified The procedure is also of advantage, however, in which a laser performance is only released after recognition of a minimum number of identification features, in particular of a register mark and/or a graphic element and/or a workpiece element, and only with adequately valid positions, since this will reliably avoid any destruction of erroneously inserted material, even if there are pass marks present on this. This procedure also ensures that an unwanted switching on of the laser can be avoided, such that the safety regulations for the use of lasers can be met.

The object of the invention is also solved, however, by a method with which, after the preparation of the processing job and before the start of the acquisition or detection of the workpiece an analysis process is carried out to determine the sequence of the identification features which are to be interrogated in turn, wherein the graphic or graphic area respectively is divided into a plurality of sectors, in particular into four sectors, wherein, as the first identification feature to be interrogated, an identification feature in the first sector is determined and set, whereupon a second identification feature to be interrogated is determined and set in a further sector, in particular in the diagonal sector, and then the further identification features are determined and set in sequence, preferably always those identification features with the shortest adjustment path of the laser.

Advantageous in this situation is the fact that, as early as after the second pass mark, the rotation of the workpiece is already perceptibly more precisely known than if pass marks located close to one another are used, and, as a result, subsequent erroneous recognitions can very largely be excluded.

Of advantage is a procedure with which, as the first sector, that sector is selected which is closest to the starting position or a stopping position of the laser, since thereby the sector with the shortest travel path is selected for the first position.

With a procedure with which, as the first identification feature, that identification feature in the first sector is detected which is located closest to the starting position of the focusing unit, the situation is advantageously attained that the most rapid possible adjustment is achieved.

The procedure is also of advantage, however, with which, as the second identification feature, that identification feature in the second sector is detected which lies closest to the starting position of the focusing unit or of the first selected identification feature, since thereby, in turn, the shortest and fastest path for the next identification feature is used. At the same time a high degree of precision and high speed are attained.

The object of the invention is also solved with a method with which, after the processing process, the actually identified position of the identification features and/or the graphic or graphic area respectively in the working area is displayed on the computer at the corresponding position.

It is advantageous in this situation that the user has the opportunity directly of improving the identification for the next processing process.

A procedure is also of advantage with which the new location is represented at the display element flashing or with a changed color or inverted, since this will make errors in insertion immediately visible to the user, or the user can more easily identify the difference between the stored position and the last detected position.

With a procedure with which a message is displayed at the display element and/or at the laser plotter for the correction of the new location or position of the graphic or of the graphic area respectively, such that, at confirmation, the new location is corrected for the next processing process, the situation is advantageously achieved that only at the explicit wish of the user is a job repositioned, and thereby a material which has uniquely been imprecisely inserted will not have any negative effect on subsequent processing processes.

Also of advantage is the procedure with which, at a manual correction during the processing process at the laser plotter for the recognition of the first identification feature, the position defined at the display element in the working area is compared with the actual position in the processing area of the laser plotter, since in this way a comparison is only carried out at a manual correction, such that, if there is no correction, an immediate start with a new processing process is possible.

The object of the invention is also solved, however, by a device for carrying out the method, with which, at the display monitor arranged at the display element or at the laser plotter, a working area is presented with a laser position corresponding to the processing area and the position of the laser, in particular of the focusing unit, and that one or more same or different processing jobs with a graphic or a graphic area respectively and identification features pertaining to these can be loaded, and the graphic or graphic area respectively are formed with identification features in a displaceable manner at the working area represented, such that the graphic or the graphic area respectively can be adjusted to the laser position, or the laser position can be adjusted to the graphic or the graphic area respectively.

It is advantageous in this situation that in this way a simple comparison can be made between the position in the processing area of the laser plotter and at the display element of the external components, or at the display monitor of the laser plotter respectively, by the displacement of the graphic or of the laser position. As a result, a user can carry out a positioning very rapidly, or also change it. The displacement of the graphic can in this situation be carried out in a simple manner with a conventional mouse cursor for display elements, with which the user simply uses the mouse cursor to select the graphic or the laser position and, for example with the right-hand mouse button held down, the cursor is moved to the desired position. This is of course also possible with today's conventional touch panels, with which first the graphic or laser position is marked by touching, and the user, by tracing his finger on the panel, then moves the graphic or laser position in the desired position. This means that it is no longer necessary for the user to place the workpiece in the laser plotter always at its defined location, since by simple displacement a very much faster position comparison can be made.

An embodiment is of advantage with which one or more identification features are formed by register marks and/or graphic elements and/or workpiece elements, since the user is thereby provided with the possibility of being able to select features which are freely determined at will for the position recognition. It is often the case that a workpiece, in particular with electronic films, are so extensively printed that no or only a few register marks can be allocated, such that, with processing items of this type, the user defines the graphic or the image, and in particular a particularly striking region from this, as the identification feature, and thereby an optimum position recognition can be carried out.

With an embodiment with which means are arranged in the processing area of the laser plotter for the positioning of the workpiece, the situation is advantageously reached in that the user can carry out a rapid positioning of a new workpiece, which in turn is arranged at the same place. Nevertheless, it has been shown that, by rapidly inserted workpieces, minimal deviations in the position occur, such that, before each work process, a position recognition is necessary in order to carry out precise processing, in particular an exact cutting out of the graphic.

An embodiment is of advantage with which input means are arranged at the laser plotter for the adjustment movement of the laser, in particular of the focusing unit, and of the laser position in the display area of the display element, since in this way the user can carry out an adjustment and positioning directly at the laser plotter, independently of the display element. This means that the user does not need to keep changing between laser plotter and display element.

Of advantage is an embodiment with which an input means is arranged at the laser plotter for the new starting of a processing process carried out previously, in particular for finishing the processing of one or more loaded processing jobs, since in this way the user needs only interact with the device, in particular with the laser plotter, and need only work as little as possible on the display device (e.g. PC with mouse).

An embodiment is of advantage with which the laser plotter comprises a protective cover, since this allows for a start of a processing process by way of the protective cover.

In addition to this, the object of the invention is also solved by a laser plotter. In this situation it is of advantage that, with regard to user friendliness for such a laser plotter, with which preferably the focusing unit of one or more lasers is moved for adjustment over a rail in linear fashion, horizontally and vertically, for the processing of the workpiece, the user friendliness for the positioning is substantially simplified. With larger laser plotters it is even possible that, after the first positioning, all further processing processes which are the same can be carried out directly from the laser plotter, i.e. that the user takes the finished processed workpiece out of the laser plotter, inserts a workpiece which is to be newly processed for the same processing procedure, and the start is then made directly from the laser plotter, out of the processing process, wherein any corrections which may be necessary can in turn be carried out directly at the laser plotter.

The object is further solved by a method with which, as a function of the identification feature, an engraving and/or inscription region is determined and stored, or that, as a function of the graphic or the graphic area respectively, an engraving and/or inscription region is determined and stored, whereupon, during the processing process after the acquisition of one or more identification features, in particular of register marks, and/or graphic elements, or a part of the graphic and/or workpiece elements, a position of the engraving and/or inscription region allocated to the identification features is identified. It is advantageous in this situation that this allows for exact engravings to be carried out, and elaborate set-up times (exact insertion of the material, removal of the material) can be done away with. By the allocation of the engraving region(s) to the identification features, it is also ensured that an engraving can only be applied at those places on the workpiece which are defined for such processing processes. This therefore prevents undesired engraving into an image or a graphic, or that, for example, during the engraving of a mobile telephone or a tablet with an optics unit, the engraving is carried out by way of the optics unit, in particular the protective glass.

In addition to this, the object of the invention is solved by a further method with which, after the recognition of the location or the orientation of the workpiece and/or of the graphic or the graphic area, an engraving checking process is carried out.

It is advantageous in this situation that the device can be operated to the greatest degree possible in high performance ranges (engraving quality, engraving speed), and unfavorable regions (e.g. lower process speed at certain angles) can be avoided. It is also often the case that with such linear-adjustable laser units, in particular focusing units, it is not possible to engrave every desired angle perfectly, with the result that the attention of the user is drawn to this accordingly.

With a procedure with which, on the basis of the location or alignment detected of the graphic or the graphic area respectively, and/or of the workpiece, it is determined whether an engraving or inscription, in particular an engraving process in the defined engraving region, is possible or not, the situation is advantageously achieved that thereby rejects and/or long engraving duration due to unfavorable movement paths can be avoided.

Procedures are also of advantage, however, with which, at the display element, in particular at the computer, or in a databank or the control unit of the laser plotter, parameters, such as, for example, engraving angle deviation, alignment angle deviation, engraving depth, engraving width, etc. for the deviation from the optimum preferably horizontal and/or vertical orientation of the graphic or the graphic area respectively and/or of the workpiece, are stored, since in this way the quality of the engraving can be substantially improved, since the engraving possibilities can be matched to the capacities of the laser plotter.

Of advantage is the procedure that, in the event of a tolerance range of the specified parameters being exceeded, the engraving process is stopped, wherein, by manual input, a clearance and therefore continuation of the engraving process is possible, since in this way the users can determine for themselves whether the work process should be conducted to the end.

Also advantageous are procedures with which, after the insertion of the workpiece in the processing area, a laser-pointer of the laser is positioned onto any desired register mark, whereupon a processing image, represented on a display element, of the graphic or the graphic area respectively, with the identification feature belonging to it, is displaced at the display element in such a way that a laser position displayed at the display element concurs with the identification feature marked with the laser-pointer, since, as a result of this, during the positioning of the workpiece, the user can identify in the laser plotter, by means of the laser-pointer, the respective position directly at the workpiece, and therefore does not need to be constantly looking between the display element and the laser plotter. This therefore makes orientation and positioning very simple with the laser-pointer provided.

With these procedures, after the preparation of the processing job and before the start of acquisition and detection of the workpiece, an analysis process is carried out to determine the sequence course of the identification features which are to be interrogated one after another, wherein the graphic or graphic area respectively is divided into several sectors, in particular into four sectors, wherein, as the first to be interrogated, a register mark is acquired and determined in the first sector, whereupon a second register mark to be interrogated is then acquired and determined in a further sector, in particular in the diagonal sector, and then the further register marks, following one after another, preferably always that register mark with the shortest travel path of the laser, are acquired and determined, since in this way the production of the processing job is made substantially easier, due to the user not needing to make any considerations about specific sequence courses of the laser plotter or the appearance of the identification features.

Also advantageous are procedures with which, after the ending of the processing process, the workpiece is removed from the processing area and, as appropriate, a new workpiece is inserted, whereupon, by activation of an input means at the laser plotter, or automatically by closing a protective cover for the processing area at the laser plotter, a new processing process is started, since, as a result of this, the downtime of the laser plotter can be substantially reduced, due to the user no longer having to go to the computer any more for the starting of the work process.

Finally, the procedure is also of advantage with which, after the processing process, the actually identified position of the identification features and/or the graphics or graphic areas belonging to them in the working area is displayed at the working device at the corresponding position, since in this way the user is informed in a simple manner that the location or position has changed in relation to the previously processed workpiece. The user can therefore deliberately react to whether a new alignment is necessary or not.

The invention is described hereinafter in the form of exemplary embodiments, wherein attention is drawn to the fact that the invention is not limited to the exemplary embodiments or solutions represented and described.

Figure 2:
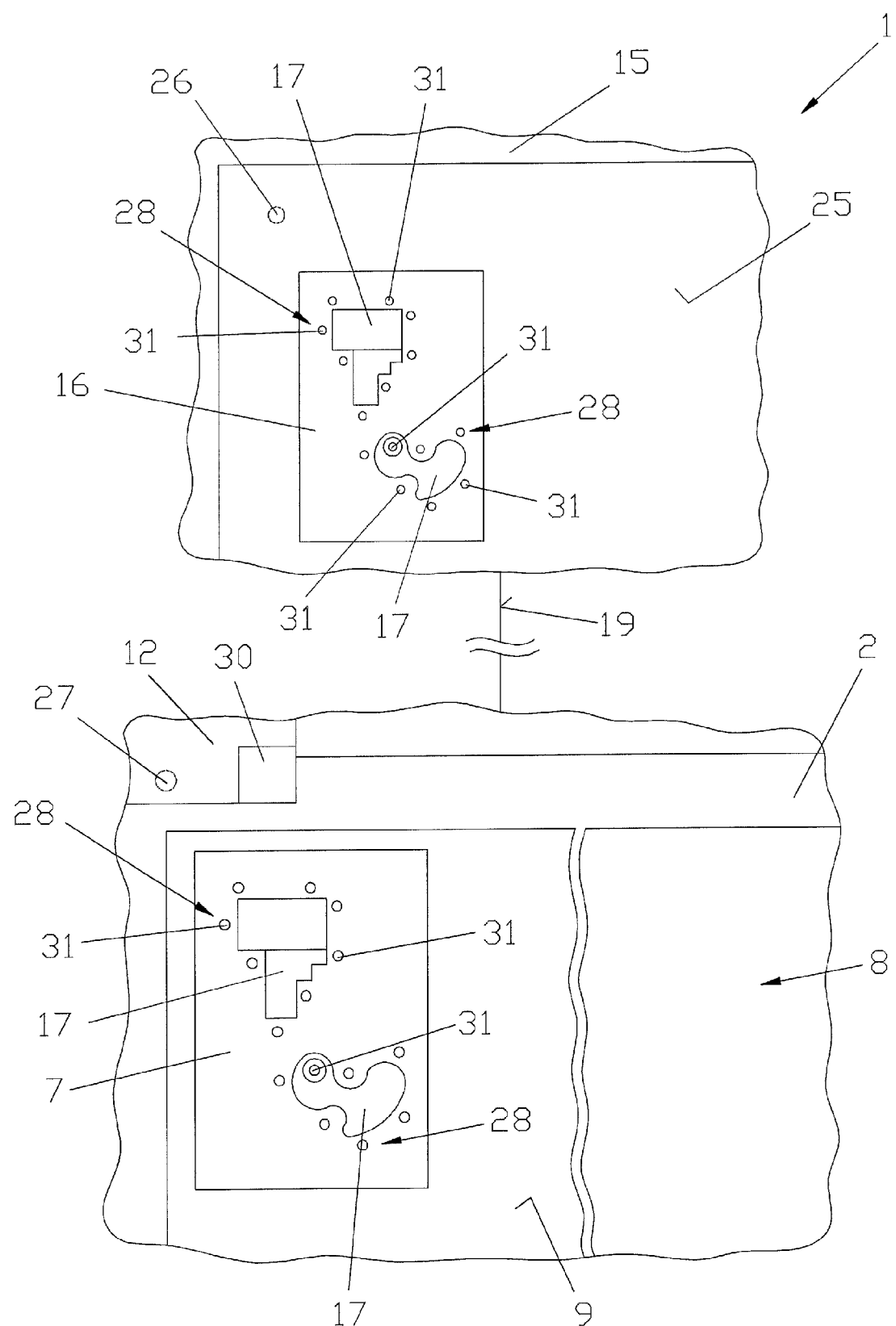
Figure 3:
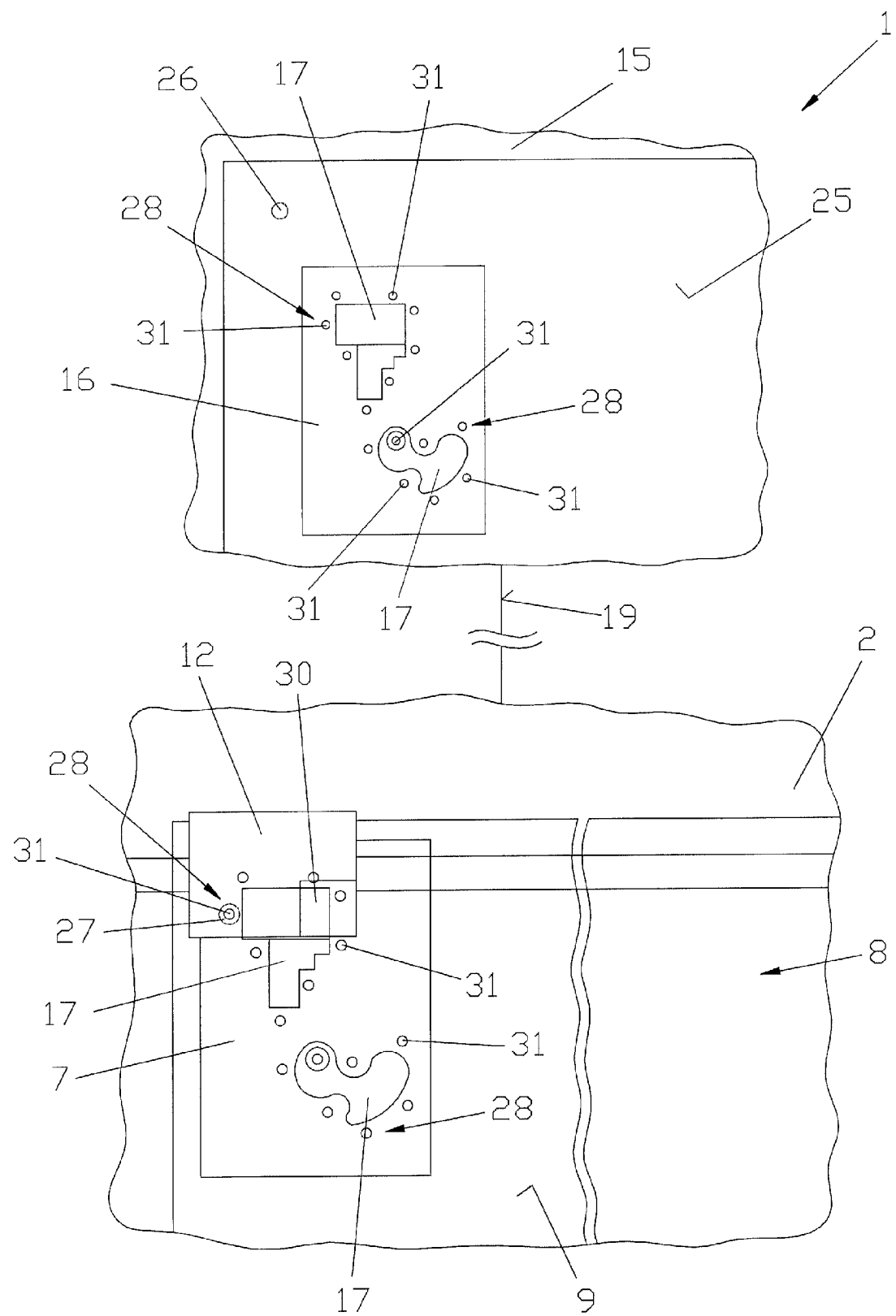
Figure 4:
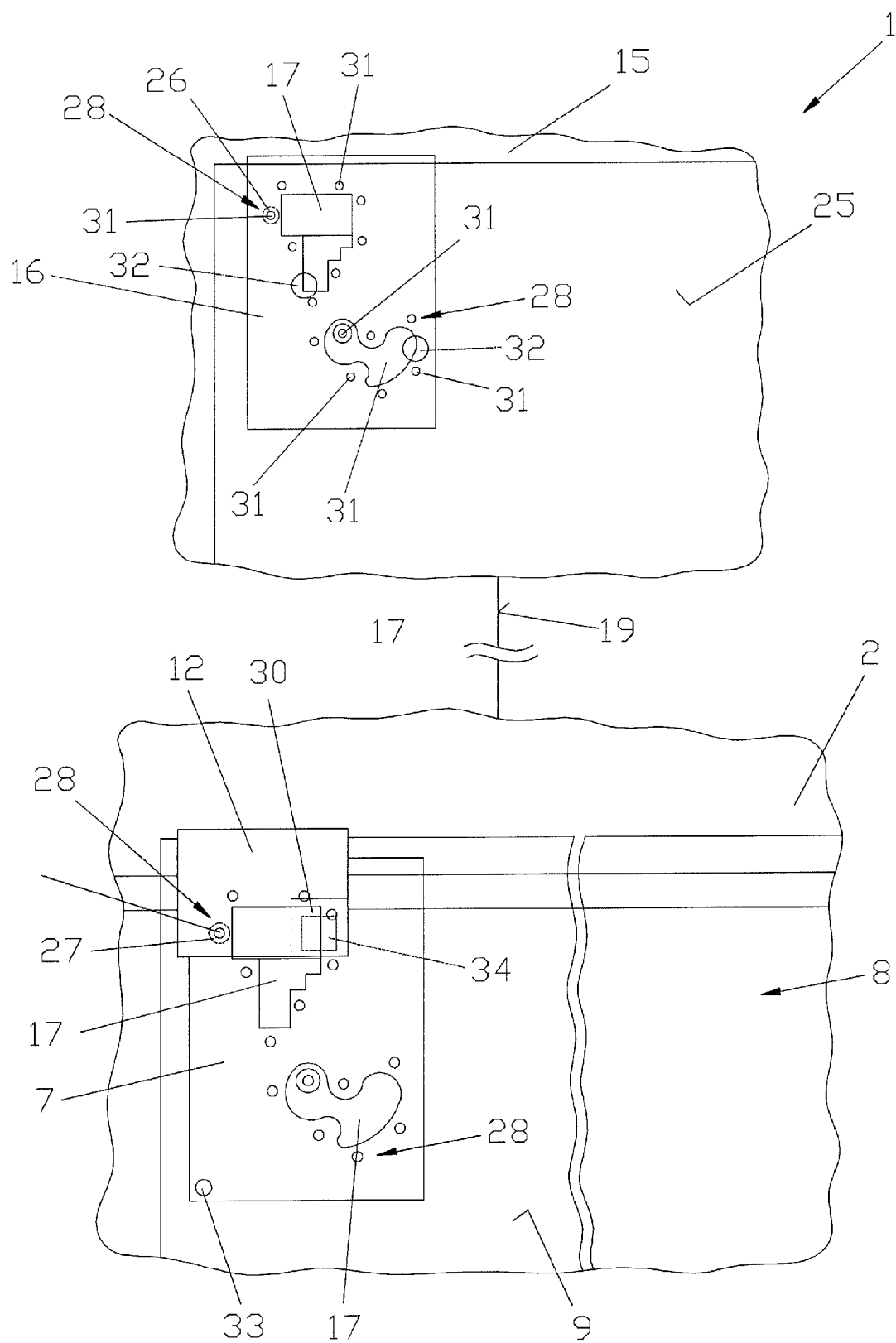
Figure 5:
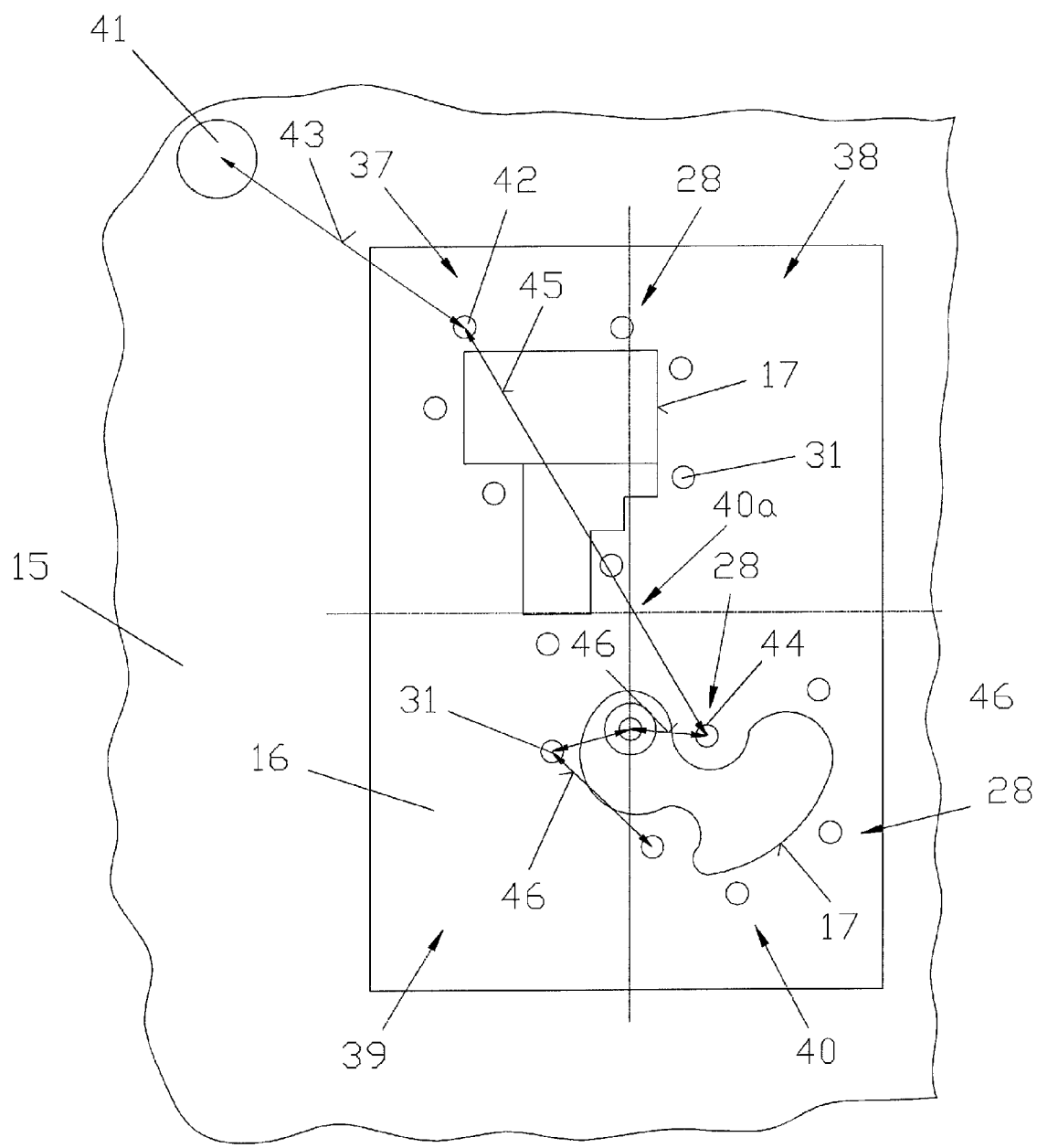
Figure 6:
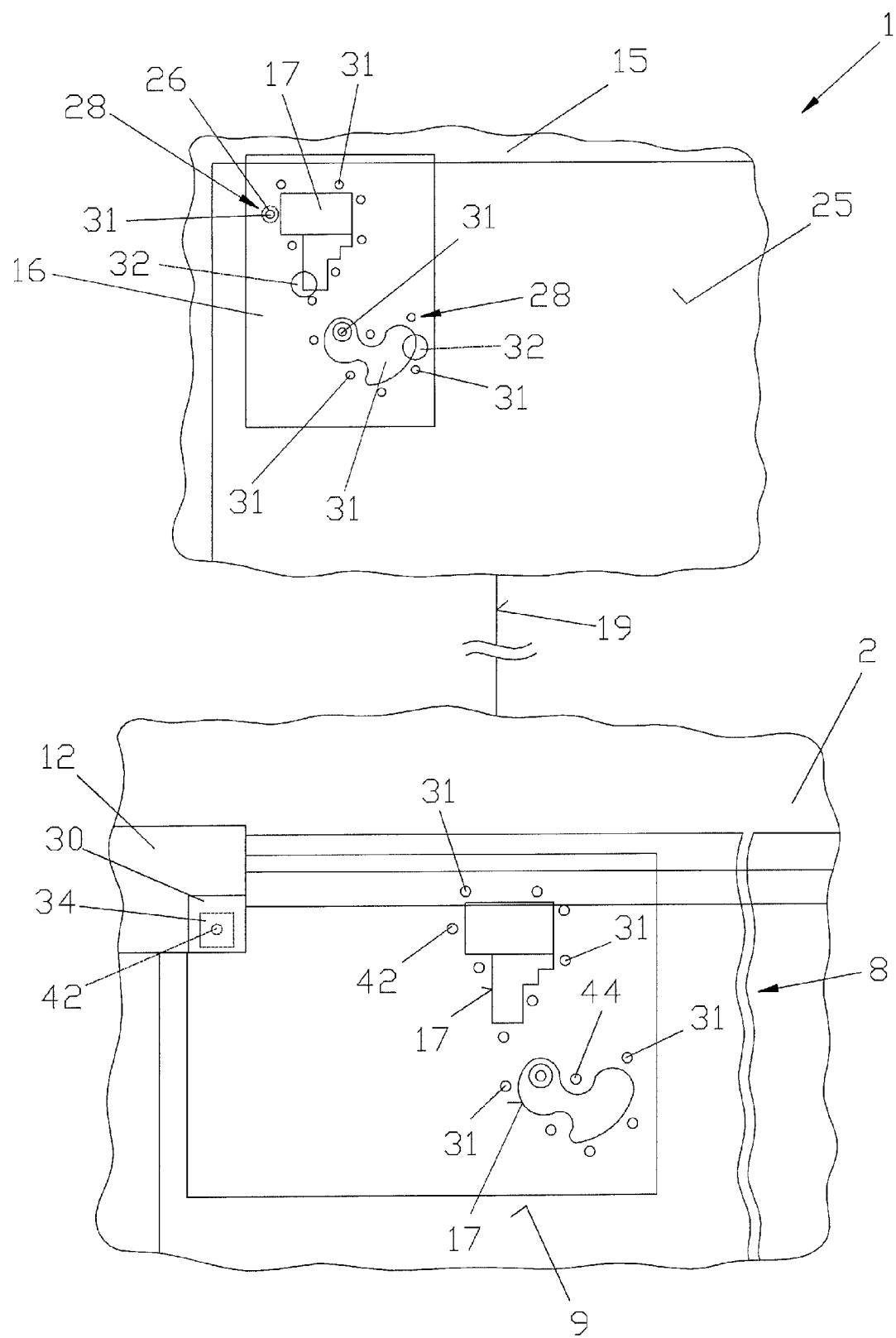
Figure 7:
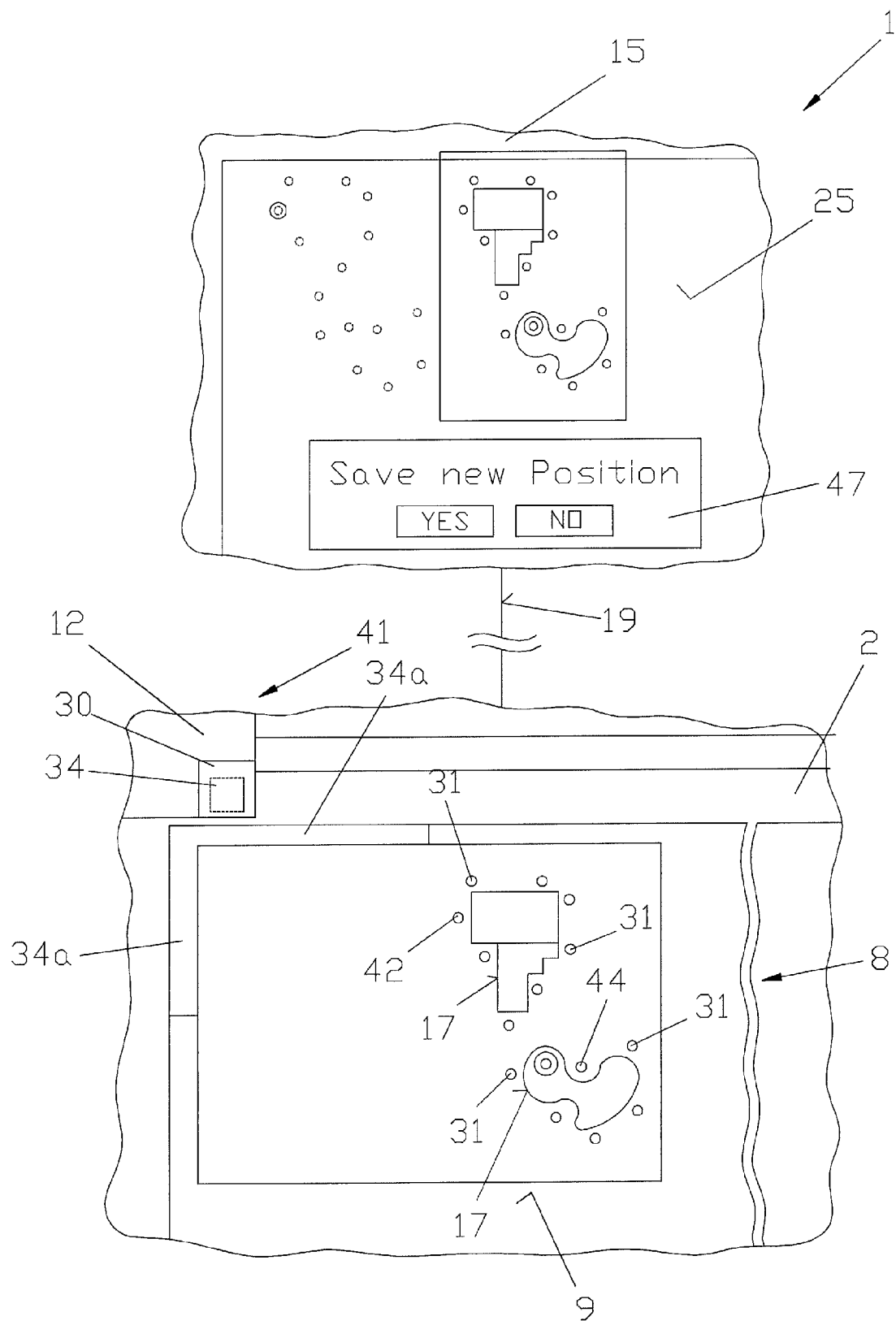
Figure 8:
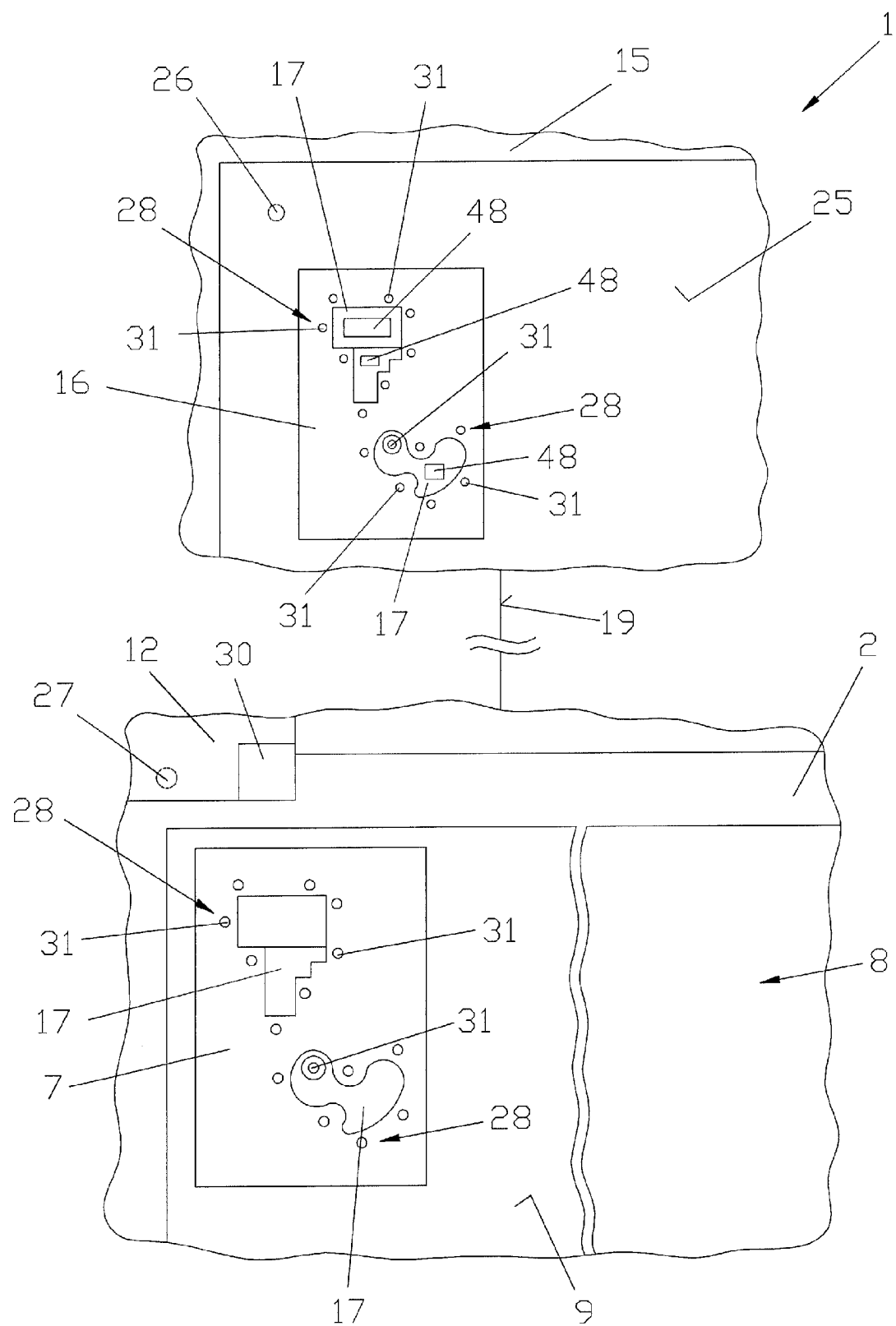

The figures show:

FIG. 1 a schematic representation of a device with a laser plotter and display element connected to it;

FIG. 2 an illustrative representation of a part section of the device with a processing job loaded and workpiece inserted;

FIG. 3 an illustrative representation of a part section of the device, with a laser-pointer positioned on an identification feature;

FIG. 4 an illustrative representation of a part section of the device, with which the graphic at the display element has been adjusted to the position of the laser-pointer;

FIG. 5 an illustrative representation of a part section of the device, in particular of the display element, for the determination of the identification feature which is to be interrogated;

FIG. 6 an illustrative representation of a part section of the device with changed tool format;

FIG. 7 an illustrative representation of a part section of the device, with which the graphic at the display element is represented at the actual position of the workpiece after a processing process;

FIG. 8 an illustrative representation of a part section of the device for use for engraving and/or cutting of a workpiece.

It should be stated by way of introduction that, in the different embodiments, the same parts are provided with the same reference numbers or same component designations, wherein the disclosures contained in the entire description can, by analogy, be transferred to same parts with same reference numbers or same component designations. The location details selected in the description, such as, for example, top, bottom, side, etc. relating to the figure described, can, in the event of a change of location, be transferred by analogy to the new location. Individual features or feature combinations from the exemplary embodiments shown and described may also represent independent inventive solutions.

Represented schematically in FIG. 1 is a processing device 1, in particular a laser plotter 2, also referred to as a laser engraver, with which, arranged and operated in a housing 3, is at least one, and in particular two, beam source(s) 4, in the form of lasers 5,6. The lasers 5 and 6 take effect, preferably alternately, on the workpiece 7 which is to be processed, wherein the workpiece 7 is positioned in a processing area 8 of the laser plotter 2, in particular on a processing table 9. A laser beam 10 emitted from the beam source 4 is sent via deflection elements 11 to at least one movable focusing unit 12, arranged for both beam sources 4, from which the laser beam 10 is deflected in the direction of the workpiece 7 and is focused for the processing. The controlling, in particular the position controlling of the laser beam 10 to the workpiece 7, takes place by means of software running in a control unit 13, wherein, at an external component 14, in particular at a display element 15 in the form of a computer 15 or a control device, a processing job 16 with a graphic 17 and/or a text 18 is prepared and/or loaded, which is transferred to the control unit 13 of the laser plotter 2 via a data connection 19, which, from a deposited databank 20, carries out a conversion of the transferred data, in particular of the processing job 16 with the graphic 17 and/or of the text 18, for the controlling of the individual elements of the laser plotter 2.

The laser plotter 2 further comprises input means 21, in particular direction keys 22, for moving and positioning the focusing unit 12 and therefore the laser beam 10. In this situation, it is possible for further additional input buttons 21 to be provided, for example in the form of a confirmation button 23 or the like. It is also possible for a display monitor 24 to be provided at the processing device 1, at which, for example, the same functions and displays are represented which correspond to the display element 15. This display monitor 24 can in this situation be designed as a touch monitor 24, such that the user, by touch, can carry out controlling or make inputs, or carry this out by way of the input means 21.

No more detailed description of the mechanical arrangement of such a laser plotter 2 will be provided, since this is already known from the prior art, in particular from the Applicants' WO 1999/038643 A, and can be taken from this. It is of course also possible to make use of an arrangement from other laser plotters 2 known from the prior art.

According to the invention, provision is now made for a simplification of the controlling of the laser plotter 2 for the user with a special processing process, in particular in that the handling for the positioning of the workpiece 7 is substantially improved, such that the operation is made easier for the user, and the possibility of errors is minimized.

In order to increase user-friendliness, provision is made for a working area 25 to be represented at the display monitor 24, arranged at the display element 15 or at the laser plotter 2, with a laser position 26 corresponding to the processing area 8 of the laser plotter 2 and the position of the laser beams 10 of the lasers 5,6 and of the focusing unit 12 respectively, which is rendered visible by a conventional laser-pointer 27 in the processing area 8. In this situation, one or more same or different processing jobs 16 (as represented schematically) can be loaded with the graphic 17 or a graphic area respectively and identification features 28 belonging to them, or can be produced by the user, wherein the graphic 17 or graphic area, with the identification features 28, are formed such as to be movable at the working area 25 represented, such that the graphic 17 or the graphic area can be adjusted to the laser position 26, or the laser position 26 to the graphic 17 or graphic area. For this purpose, the user can carry out a corresponding adjustment at the laser plotter 2 by way of the input means 21, or carry out the adjustment of the focusing unit 12 by means of an adjustment area and/or control area 29 at the display element 15, or by simple movement of the laser position 26 with a mouse or cursor of the computer 15. It is also possible for means to be arranged in the processing area 8 of the laser plotter 2 for the positioning of the workpiece 7, in particular positioning rails, such that the user, when inserting the workpiece 7, can bring the workpiece 7 in contact with these means, and therefore the workpiece 7 is always deposited in approximately the same position in the processing area 8.

In FIGS. 2 to 4, a sequence course is now described schematically for the handling of the laser plotter 2 for the performance of a processing process, with which a part section of the computer 15, in particular of the work area 25 displayed therein, and a part section of the laser plotter 2, in particular of the processing area 8, are represented in a simplified manner and schematically, such that the sequence course of the method can be seen.

In this situation, first the user prepares a processing job 16 or an already prepared processing job 16 is loaded. The processing job 16 contains a graphic 17 or a graphic area, and identification features 28, which are displayed or represented or prepared at the external component 14, in particular the computer 15, at the working area 25, as is represented in FIG. 2 in the working area 25. Next, the identification features 28 and the graphic 17 or the graphic area are applied at the workpiece 7, wherein this can be done, for example, by printing onto the workpiece 7. In this connection, it is also possible for the application to be carried out independently of the computer 15 or the laser plotter 2, by other devices, in particular a printing machine, but which processes the same processing job 16.

After the workpiece 7 has been printed, the workpiece 7 is arranged in the processing area 8 of the laser plotter 2 with an optics unit 30 for the acquisition of the identification features 28 (see FIG. 2, processing table 9), wherein appropriate aids, such as contact rails 34a or the like can be used as means for the positioning. Next, by means of the start of the processing process, the acquisition or detection of the workpiece 7, takes place, in particular of the identification features 28, in order to detect the position and alignment of the workpiece 7, in particular of the graphic 17 or graphic area applied, in the processing area 8, i.e. an automatic location determination of the workpiece 7 is carried out. Next, after the successful identification of the workpiece 7, in particular of the graphic 17 or the graphic area, the processing process is carried out, wherein, for this purpose, the graphic 17 is preferably cut out by the laser 5 or 6, as is known from the prior art.

Due to the fact that with such processing processes of this type it is often necessary for different workpieces 7 to be processed, with widely differing formats and shapes and widely differing graphics 17 printed on them, it is of advantage if the first time positioning goes very easily and rapidly for the user.

In this situation, provision is made according to the invention that, for the positioning, in particular when carried out for the first time, after the insertion of the workpiece 7 (FIG. 2), in the processing area 8 of the laser plotter 2, the user positions the laser-pointer 27 of the laser 5, 6, which is arranged at the focusing unit 12 and which, for safety reasons is always present, on any particular identification feature 28, i.e. the user simply moves the laser-pointer 27 by way of the input means 21, in particular the direction keys 22, in such a way that it is aligned or beamed on an identification feature 28 which the user happens to have selected, as can be seen in FIG. 3. Next, the user moves the processing image of the graphic 17 or the graphic area, which is represented on the display element 15, with the identification feature 28 belonging to it, at the display element 15 in such a way that the laser position 26 now displayed at the display element 15 coincides with the identification feature 28 marked with the laser-pointer 27, as shown in FIG. 4. Accordingly, by simple movement of the graphic 17, or, conversely, by movement of the laser position 26 at the display element 15, onto the corresponding identification feature 28, the position at the display element 15 and at the laser plotter 2 are matched, such that, at the start of a processing process, the correct data, in particular the positions for the laser beam 10, can be determined and transferred, such that the corresponding deposited functions can be loaded and produced for the corresponding positions, as is known from the prior art for such processing processes.

For the recognition of the workpiece 7 or the graphic 17 it is necessary for appropriate identification features 28 to be present which can be identified by the laser plotter 2, in particular by an optics unit 30. In this situation, the optics unit 30 is preferably formed by a camera, which occupies a specific area of the processing table 9, wherein corresponding adjustment possibilities, such as contrast, brightness, image size, etc. can be carried out at the computer 15. Preferably, the identification features 28 are represented by register marks 31, such as with circles, and/or formed as graphic elements 32, such as by a broken-line circle in FIG. 4, and/or workpiece elements 33, such as, for example, a centering hole in accordance with FIG. 4, wherein the register marks 31 are additionally applied, whereas the graphic elements 32 and/or workpiece elements 33 are selected and determined from the graphic 17 or the graphic area or the represented workpiece 7. Due to the fact that, with the simplified handling method described, the positioning takes place by means of the laser-pointer 27, an automatic auto-correction must be carried out, since the optics unit 30 for the recognition of the identification features 28 does not coincide with the laser-pointer position; i.e. for the recognition and acquisition of the identification feature 28 marked with the laser-pointer 27, the auto-correction is carried out, with which, by automatic movement of the focusing unit 12, the optics unit 30 is positioned over this identification feature 28. In this way, the identification feature 28 can be picked up by the optics unit 30 and a check made simultaneously as to whether the adjustment for the recognition and evaluation is functioning correctly, i.e. that, after the positioning, the optics unit 30 is picking up the identification feature 28 and that a recognition is being carried out, in order to determine whether flawless recognition is possible. For carrying out the auto-correction, an adjustment path is recorded between the laser-pointer 27 and the optics unit 30, in particular a center of the optics unit 30, such that, if there is a change of the focusing unit 12, at which the optics unit 30 and the laser-pointer 27 are arranged, adjustments can be made accordingly to the new focusing unit 12. It is of course possible for other necessary parameter to be recorded and changed.

In principle it should be mentioned that, for the recognition of an identification feature 28, the laser plotter 2 moves the optics unit 30 to the specified position in such a way that the identification feature 28 is arranged inside a definable search window 34, represented by broken lines in FIG. 4, is arranged at the optics unit 30. In this situation, however, it is not absolutely necessary for the identification feature 28 to be arranged in the center, but rather that it need only be partially in the search window 34, although completely present in preferable, such that it is identified as an identification feature 28. If there is a movement to the center of the search window 34, or to a defined point in the search window 34, then, on recognition of the identification feature 28 inside the search window 34 by the optics unit 30, the optics unit 30, and the laser 5, 6 or laser beam 10 coupled to it, are moved in such a way that the identification feature 28 is positioned in the center of the search window 34, or that, on recognition of the identification feature 28 inside the search window 34, the position is calculated of the identification feature 28 in relation to the center of the search window 34 or to a starting position or defined point allocated to the search window 34. If a movement into the center of the search windows 34 is carried out, it is possible for a defined number of centering attempts to be recorded for the centering of the identification feature 28 in the search window 34, wherein the processing process is then stopped and can be continues manually, i.e. the number of attempts is limited, such that, with identification features 28 which are difficult to identify, there is no possibility of the laser plotter 2 endlessly attempting to carry out centering. The user can therefore intervene in the processing process much more rapidly. In this situation it is also possible that, in the event of non-recognition of an identification feature 28, by actuation of an input means 21 at the laser plotter 2 or by activation of a button at the display element 15, the identification feature 28 which has not been identified will be jumped over, and the search procedure will be continued with the next determined identification feature 28, or the corresponding identification feature 28 is set at the laser plotter 2 by actuation via the input means 21, whereupon the processing process is continued. In addition, it is possible that, in the event of an identification feature 28 not being identified and of a consequent stopping of the processing process, an error correction of the laser position is carried out at laser plotter 2 by actuation of input means 21, wherein the relative position of the laser position 26 to the graphic 17 or to the graphic area and/or the identification feature 28 is displayed at the display element 15; i.e. for example, if at the first search procedure the first identification feature 28 is not identified, the user can move to the first position manually, which is also displayed at the display element 15.

It is often the case that, after the first positioning or matching of the position in the laser plotter 2 to the computer 15, that a further processing process of the same form must be carried out. In order for a high degree of user-friendliness to be provided here too, the start of a new, same processing process should be as simple as possible for the user. For this purpose, after the ending of the processing process, the workpiece 7 is removed from the processing area 8 and a new workpiece 7 is inserted. In this situation the new workpiece 7 is positioned in the same position as the workpiece 7 processed previously, for which purpose means are arranged in the processing area 8 of the laser plotter 2, in particular the contact rails 34a, for the positioning of the workpiece 7, as represented schematically in FIG. 1, whereupon the user closes a protection cover 35 for the processing area 8. The closing of the protection cover 35 is identified in this situation by recognition means 36, in particular a sensor contact, wherein, for safety reasons, without the protection cover 35 being closed, no operation of the laser 5, 6 can take place. Accordingly, once the user has closed the protection cover 35, and this has been identified by the recognition means 36, by activation of an input means 21, in particular of the confirmation means 23, a new processing process is started at the laser plotter 2, such that the user is not now obliged, as is known from the prior art, to carry out the start of a new processing processes at the computer 15, but can start directly at the laser plotter 2. It is of course possible in this situation that independent input means 21 can be arranged and used for this purpose.

Based on a control arrangement according to the invention, however, it is also possible for a new processing process to be started automatically at the laser plotter 2 by closing the protection cover 35 for the processing area 8. This can be carried out inasmuch as the laser power for the processing of the workpiece 7 is started or increased after the recognition of the first identification feature 28, in particular of a register mark 31 and/or a graphic element 32 and/or a workpiece element 33, i.e. after the closure of the protection cover 35, initially with reduced or disconnected laser power, the first identification feature 28, or a defined number of identification features 28, are moved into position and identified, whereupon the laser power is increased for the processing, in particular for cutting, of the workpiece 7. In this situation, however, it is also possible that first all the identification features 28 are identified with reduced or disconnected laser power, and only after this is the laser power for the processing process increased to the set values, shortly beforehand.

With such a procedure it is of advantage if, at the activation of a new processing process, in the event of non-recognition of the first identification feature 28, the processing process is stopped directly at the laser plotter 2, which can happen, for example, if the workpiece 7 is laid in the incorrect position. The user can then carry out a positioning by manual adjustment using the direction keys 22 and continue the processing process by actuating the confirmation button 23. If the processing process is then again interrupted, the user has the possibility in turn, by the corresponding corrective procedures, of continuing with the processing process.

Shown in FIG. 5 is a schematic representation of the procedure for determining the sequence of the individual sequential identification features 28 which are to be interrogated or detected, wherein, for this purpose, only a part section of the display element 15 with the loaded processing job 16 is represented.

In this situation, after the preparation of the processing job 16 and before the start of the acquisition or detection of the workpiece 7, an analysis process is carried out to determine the course of the sequential identification features 28 which are to be interrogated. First the graphic 17 or the graphic area is divided into several sectors 37,38,39,40, in particular into four sectors 37,38,39,40, wherein, for this purpose, a midpoint 40a or center or an optimum sector-point of the graphic 17 or graphic area is first detected and determined. The division into sectors 37,38,39,40 is represented schematically in FIG. 5 by broken lines.

After the division into sectors 37,38,39,40, the sequence of the identification features 28 to be interrogated is then determined, wherein, as the first identification feature 28 to be interrogated, a first identification feature 28 is detected and determined in the first sector 37, i.e. that preferably as the first sector 37,38,39,40, that sector 37 is detected which has the shortest movement path of the focusing unit 12 from a starting point or a stopping position 41, which in FIG. 5 is represented in the form of a circle, and, in this sector 37, that first identification feature 28, in particular a first register mark 42, is now detected and determined with the shortest travel path 43 from the stopping position 41. Next, a second identification feature 28 which is to be interrogated, in particular a second register mark 44, is detected and determined in a further sector 37,38,39,40, in particular in the diagonal sector 40, wherein, preferably, the shortest travel path 45 from the first register mark 42 determined previously to the next closest identification feature 28 in the next sector 40 is detected. It is also possible in this situation, however, that in the next sector 40 the detection of the next closest identification feature 28 can take place moving out from the stopping position 41. After the first register mark 42 and the second register mark 44, or, respectively, the first and second identification features 28 have been detected in the analysis process, next the further identification features 28 are detected and determined in sequence, preferably always that identification feature 28 with the shortest movement path 46 of the laser 5,6 or the focusing unit 12 respectively, i.e. it is always the next closest register mark 31 or the next closest identification feature 28 respectively which is detected, and therefore the sequence for the interrogation of all the identification features 28 is determined. The sequence can be stored for the corresponding processing job 16, such that an analysis procedure of this type is only carried out once, during the preparation of the processing job 16.

Provision is further made that, with a processing process, after the identification of the identification feature 28, corresponding images are deposited or stored, which, by corresponding selection or movement of a mouse at the display element 15, can be called up or displayed; i.e. after the start of the processing process, the laser plotter 2 first moves to the first identification feature 28, i.e. in this exemplary embodiment the first register mark 42 and picks this up with the optics unit 30 and analyzes it accordingly. The image picked up by the optics unit 30 is stored with the corresponding register mark 42 in the processing job 16, such that the user can interrogate this image during or after the processing process, by simply moving to the register mark 42 or clicking on it, whereupon, preferably, a new window appears with the stored image. This procedure for depositing the images which have been found of the register marks 31,42,44 is preferably carried out at every new work process or processing process, such that, at later times, an analysis can be made of the quality of the register marks 31,42,44 picked up, and appropriate adjustments or optimizations can be carried out on the parameters deposited for the recognition features 28. In this situation it is possible for the images or illustrations to be permanently stored in a memory or the databank 20 for the individual processing processes, which are provided, for example, with a serial number, or that the stored images or illustrations are overwritten at each new start of a process. In this situation, too, additional information can be stored, such as the identified position, deviations, identification quality, etc.

Shown in FIGS. 6 and 7 is a further embodiment according to the invention for improving the handling for the user. The situation often arises that the format of the workpiece 7 or the scaling of the graphic 17 changes, such that appropriate adjustments must be carried out if the position of the graphic 17 moves as a result.

For example, at the beginning the workpiece 7 is processed as A4 format, such that the user, when starting the operation, makes an appropriate setting, as in FIGS. 1 to 5. However, if the format of the workpiece 7 changes in the course of the work, for example from A4 to A3, then the position of the graphic 17 on the workpiece 7 will often change, as can be seen in FIG. 6 in the processing area 8 of the laser plotter 2; i.e. in FIG. 6 the user has now inserted the workpiece 7 in A3 format, wherein the graphic 17 printed on the workpiece 7 has moved position. The focusing unit 12 moves, in particular with the search window 34 of the optics unit 30, to the first position, i.e. the first register mark 42, where this was located during the previous processing process. This first register mark 42 is represented by broken lines, in order for the previous position to be identified. The focusing unit 12, in particular the optics unit 30, due to the change of the graphic position caused by the change of the workpiece format, cannot now find a register mark 42, whereupon the processing process is stopped. In the computer 15, conversely, the original position of the workpiece 7 is still displayed in A4 format.

As a result, therefore, after the start of the processing process, the first identification feature 28, in particular the first register mark 42, is not identified, and the processing process is automatically stopped, as can be seen in FIG. 6. The user, using the direction keys 22 at the laser plotter 2, can now adjust the focusing unit 12 in such a way that the search window 34 of the optics unit 30 or the laser-pointer 27 is positioned over the first identification feature 28, in particular the first register mark 42 of the new position, and can therefore identify this, whereupon the processing process is continued. In principle it should be mentioned that, with a positioning and at a start of the process in the event of non-identification of an identification feature 28 in the search window 34, an auto-correction is always automatically carried out, and a second identification attempt is undertaken with a corrected position of the optics unit 30, before the processing process is stopped. As a result, the user can carry out the positioning, without having to make an adjustment beforehand, by way of the optics unit 30 or the laser-pointer 27. Next, as described heretofore, by scanning and identification of the further identification feature 28, the location of the workpiece 7, and therefore the position of the graphic 17 is determined, such that the processing, in particular the cutting out of the graphic 17, can then be carried out.

The new positions of the identification features 28 are then stored, such that, after the processing process, the new positions are displayed on the computer 15, as can be seen in FIG. 17, i.e. after the processing process or after the identification of the new location of the workpiece 7, the actually identified position of the identification features 28 and/or the graphic 17 or the graphic area belonging to it will be displayed in the working area 25 on the computer 15 at the corresponding position. In this situation, the new location can be displayed at the display element 15 as flashing or in a changed color, or inversely, or it is also possible for the old location or position to be represented only with the identification features 28, and the new location or position with the identification features 28 and the graphic 17, as represented in FIG. 7, or vice-versa. Preferably, a message 47 regarding the correction of the new location or position of the graphic 17 or graphic area is displayed at the display element 15 and/or at the laser plotter 2, such that, at confirmation, i.e. on actuation of the input button "YES" the new location is corrected for the next processing process, while conversely, with "NO", the new displayed position of the graphic 17 or identification features 28 will be deleted and the original position will be used for the next processing process.

An important consideration with a method of the type according to the invention is therefore that, with a manual correction during the processing process at the laser plotter 2 for the identification preferably of the first identification feature 28, the position defined at the display element 15 in the working area 25 is compared with the actual position in the processing area 8 of the laser plotter 2. If substantial changes are determined, the user is advised by appropriate messages 47, such that the user can simply adopt these changes.

Shown in FIG. 8 is a processing process or a method for the engraving, marking, inscribing, and/or cutting of workpieces with an applied graphic, in particular a graphic area, with the laser plotter 2, wherein the sequences or methods described heretofore are likewise used for the engraving or inscribing.

As described heretofore, first the preparation and/or loading of the processing job 16 is carried out with a graphic 17 or graphic area and identification features 28 at the display element 15, in particular the computer 15. After the processing job 16 has been prepared, the workpiece 7 must be produced, i.e. the identification features 28 and the graphic 17 or the graphic area are applied to the workpiece 7, to a base body or blank. In particular, this is done by printing the processing job 16 onto the workpiece 7. The workpiece 7 is then laid in the processing area 8 of the laser plotter 2 with the optics unit 30 for the acquisition of the identification features 28. After the start of the processing process, an acquisition or detection of the workpiece 7 takes place, in particular of the identification features 28, in order to identify the position and alignment of the workpiece 7, in particular of the graphic 17 or graphic area which has been applied, in the processing area 8, whereupon the complete processing process is carried out after successful identification of the workpiece 7, in particular of the graphic 17 or graphic area.

In order to be able to carry out an engraving or inscription on the workpiece 7, it is necessary for one or more engraving areas 48 to be defined in the processing job 16, which are determined during the preparation of the processing job 16. The engraving areas 48 and/or inscription areas are determined as a function of the identification features 28 and are stored, or determined and stored as a function of the graphic 17 or graphic area of the engraving and/or inscription area 48, whereupon, during the processing process, after the acquisition of one or more identification features 28, in particular of register marks 31,42,44 and/or graphic elements 32, or, respectively, of a part of the graphic and/or workpiece elements 33, a position is identified of the engraving and/or inscription area allocated to the identification features 28.

In this situation it is an important consideration with such laser plotters 2 that, during the engraving, the alignment of the workpiece 7 is taken into account, since the laser plotter 2 moves the focusing unit 12 linearly in the horizontal and vertical direction. Accordingly, after the identification of the location or orientation of the workpiece 7 and/or of the graphic 17 or the graphic area, and engraving-checking process is carried out.

To do this, it is necessary for parameters to be stored at the display element 15, in particular on the computer 15, or in a databank 20 or the control unit 13 of the laser plotter 2, such as, for example, engraving angle deviation, alignment angle deviation, engraving depth, engraving depth, etc. for the deviation from the optimum preferably horizontal and/or vertical alignment of the graphic 17 or graphic area and/or of the workpiece 7. This makes it possible that, depending on the arrangement and the possible function of the laser plotter 2, the necessary parameters can be adjusted or specified, such that, for example, with lower-powered laser plotters 2, only a horizontal engraving with minor angle deviation of, for example, 1 to 3°, can be adjusted, while with well-equipped laser plotters 2 an engraving angle of up to 45° or more can be set. An important consideration is that an adjustment to the device or the laser plotter 2 can be carried out.

Accordingly, account is taken during the engraving-examination process of these preset values, such that, in the event of a tolerance range of the set parameters being exceeded, the engraving process is stopped, wherein it is of course possible for the user, by manual input, to carry out clearance and release and therefore allow for a continuation of the engraving process.

The sequence for the positioning and processing of the workpiece 7 can be carried out as described heretofore, in such a way that, after the insertion of the workpiece 7 in the processing area 8, the laser-pointer 27 of the laser 5,6 is positioned onto any selected register mark 31, whereupon a processing image, represented on the display element 15, of the graphic 17 or graphic area, with the identification feature 28 belonging to it, is moved at the display element 15 in such a way that a laser position 26 displayed at the display element 15 coincides with the identification feature 28 marked with the laser-pointer 27. After the preparation of the processing job 16 and before the start of the acquisition or detection of the workpiece 7, an analysis process is carried out in turn, to determine the sequence of the identification features 28 which are to be interrogated one after another, wherein the graphic 17 or the graphic area is divided into several sectors 37,38,39,40, in particular into four sectors 37,38,39,40, wherein, as the first register mark 42 to be interrogated, that in the first sector 37 is identified and determined, whereupon a second register mark 44 to be interrogated is identified and determined in a further sector 37,38,39,40, in particular in the diagonal sector 40, and then the further register marks 31 are identified and determined one after another, but preferably always that register mark 31 with the shortest travel path 46 of the laser 4,6. It is also possible that, after the ending of the processing process, the workpiece 7 is removed from the processing area 8, and, as appropriate, a new workpiece 7 is inserted, whereupon, by activation of an input means 21 at the laser plotter 2 or automatically by closure of a protection cover 35 for the processing area 8, a new processing process is started at the laser plotter 2, such that the work process for several same engravings can be speeded up. In this situation it is also possible that, in the event of a change of location of the graphic 17, a corresponding message 47 is produced, i.e. after the processing process the actual identified position of the identification features 28 and/or of the graphic 17 or the graphic area belonging to them is displayed in the working area 25 at the working device 15, at the corresponding position.

It is possible, for example, that with a laser plotter 2 of this type, first an engraving is carried out in an engraving area 48 inside or outside the graphic 17, whereupon this graphic 17 is cut out of the workpiece 7 in accordance with the specification which has been stored. Accordingly, it is possible, with a laser plotter 2, the procedure described for the positioning, identification, and processing from FIGS. 1 to 8 to be carried out in one processing process. In particular, the controlling can be carried out in such a way that, for example, for the engraving, the laser 5 is used, wherein, for the cutting out of the graphic 17 from the workpiece 7, the further laser 6 is used, which, for example, exhibits a higher power capacity. It is also possible that, with workpieces 7 with different materials, the different areas are processed by the most widely differing lasers 5,6.

It is, however, also possible that, by the appropriate use of colors in the preparation of the processing job 16, a simpler identification of different functions can be achieved. For example, it can be stored that, for the identification feature 28, the color "Green" is used, for cutting lines "Black", for engraving "Blue", etc. In this way a simple and rapid allocation of the different circumstances and work processes in the processing job 16 can be defined and stored. It is also possible that, for the different colors, different parameters and/or functions can be allocated and stored. This can be done in such a way, for example that with the color "Green" the laser power for both lasers 5,6 is switched off or set to zero, while with the color "Black" an appropriate value or the full laser power is stored, for the cutting of the workpiece 7. It is of course also possible for the identification features 28 to exhibit different colors. This advantageously achieves the situation in which, for example, the precision for the processing process can be controlled, in that, for a high degree of precision, all the identification features 28 are interrogated for the positioning, while by contrast, with a lower degree of precision but in return with higher speed, a specific color can be deactivated by the user, as a result of which the number of identification features 28 is reduced. Accordingly, on the basis of the different colors used, different degrees of precision can be defined for the identification features 28.

With the exemplary embodiments described heretofore, it is also possible for special identification features 28 to be produced and positioned, i.e. which are used, for example, for the first and second different register marks 42,44 (not shown), and the further register marks 31 are in turn formed differently. The result is, on the one hand, that the user can identify visually which register mark 31,42,44 at the workpiece 7 is being actuated as first and second by the laser plotter 2. It is therefore also easier, for example, during the positioning of the laser-pointer 27, for this to be carried out on the first register mark 42, in order, for example by appropriate arrangement of the shape and appearance of these register marks 42, to achieve improved positioning and identification.

The use of identification features 28 with the exemplary embodiments for the cutting out of the graphic 17 and the engraving of the graphic 17 has the advantage that, on the one hand, the location of the workpiece 7 can be determined precisely, and, moreover, that possible distortions or scaling will be automatically recognized and taken into account, i.e. that if distortions and/or scaling occurs, an adjustment is automatically carried out.

If, by contrast, a workpiece 7 with a special shape, such as a mobile telephone, tablet computer, etc. is inserted, then it is possible that, by way of the optics unit 30, the outer edges of the workpiece 7 or special features will be identified, and these can be used instead of the register marks 31,42,44. For this purpose it is possible for these to be defined in the processing job 16, or for the corresponding products to be stored in memory with their dimensions.

In addition to this, with the exemplary embodiments described heretofore, it is possible for the positions which are moved to with the laser-pointer 27 to be stored in memory, wherein, for example, a corresponding mode can be selected for this purpose, or a corresponding input means 21 provided. As a result, the user has the possibility of laying the workpiece 7 into the processing area 8 in any desired way, and then positioning with the laser-pointer 27 onto an identification mark 28 and storing in memory by way of this position. After storing, the user can move the laser-pointer 27 onto a further identification feature 28 and, in turn, store this position. If the user then starts the processing process for the engraving and/or cutting of the workpiece 7, then the laser plotter 2 and/or the computer 15 can carry out a corresponding calculation for the identification of the location of the workpiece 7 and then process this. For faster calculation, it is of advantage if the user marks and stores several identification features 28 and/or moves the graphic 17 in such a way that it coincides with the first position, which, for example, is displayed on the computer 15. It is also possible for all the stored positions to be displayed, such that the user himself can undertake a certain alignment and therefore speed up the location recognition.

A function is also possible, however, with which the user first allocates, on the computer 15, a specific recognition means 28 to a defined input means 21, in particular a "Home key", such that the user then inserts the workpiece 7 into the processing area 8, sets the focusing unit 12 onto the defined identification feature 28, and, by actuating the "Home key", the graphic 17 is now automatically moved onto the laser position 26 at the display element 15.

If a device or a laser plotter 2 is operated without externally connected components 14, then a processing job 16 can be loaded by means of external memory media 49, such as, for example, a USB stick, as is shown schematically in FIG. 1. For this purpose, the user needs only to connect the memory medium to the laser plotter 2, such that a corresponding recognition of one or more stored processing jobs 16 takes place, which are displayed and selectable at the display monitor 24. However, if an external monitor is connected to the laser plotter 2, then the processing jobs 16 are also, or only, displayed on these. It is however also possible that, despite the connected computer 15, the memory medium 49 is connected to the processing job 16 at the laser plotter 2, such that the computer 15 accesses via the laser plotter 2 onto the memory medium 49, in particular the USB stick. It is of course obvious that a direct access to the memory medium 49 is possible if the memory medium 49 is connected directly to the display element 15 or the computer 15.

For the sake of good order, mention may be made in conclusion that, for the better understanding of the structure of the system 1 and its components and their constituent parts, they have in part been represented not to scale and/or enlarged and/or reduced in size.

In addition, individual features or feature combinations from the different exemplary embodiments shown and described can inherently form independent inventive solutions or solutions according to the invention.

The invention claimed is:

1. A method for processing, in particular cutting, a graphic located on a workpiece, in particular a graphic region, comprising the following steps:
    Production and/or loading of a processing job with a graphic or a graphic region respectively, and recognition features on a display element, in particular a computer;
    Application of the recognition features and of the graphic or the graphic region respectively on the workpiece;
    Arrangement of the workpiece in a processing region of a laser plotter, in particular with an optics unit for the acquisition of the recognition features;
    Acquisition or detection of the workpiece, in particular of the recognition features, in order to determine the position and alignment of the workpiece, in particular of the applied graphic or graphic region respectively, in the processing region;
    Carrying out the processing process after successful identification of the workpiece, in particular of the graphic or graphic region respectively, wherein
    after the laying of the workpiece in the processing region, a laser-pointer of the laser is positioned onto any desired recognition feature,
    whereupon a processing image of the graphic or of graphic region respectively, represented on a display element, is displaced with the recognition feature relating to it on the display element in such a way that a laser position displayed at the display element coincides with the recognition feature marked with the laser pointer.

2. The method according to claim 1, wherein one or more recognition features are formed by register marks or graphic elements or workpiece elements, wherein the register marks are additionally applied, while by contrast the graphic elements or workpiece elements are selected and determined from the graphic or graphic region respectively or the workpiece represented.

3. The method according to claim 1, wherein the adjustment of the laser-pointer takes place directly at the laser plotter by way of input means, in particular buttons, wherein the laser position is constantly updated at the display element, or, after the adjustment procedure, by activation of an input means, the new laser position is transferred to the display element and changed at the display element.

4. The method in according to claim 1, wherein, for the recognition of the recognition feature marked with the laser-pointer, an auto-correction is carried out, during which the optics unit is positioned over this recognition feature.

5. The method in according to claim 1, wherein in the event of non-recognition of the recognition feature, by the actuation of an input means at the laser plotter or by activation of a button at the display element, the recognition feature which was not recognized is jumped over, and the search procedure is continued at the next-determined recognition feature, or the corresponding recognition feature is set manually at the laser plotter, whereupon the processing is then continued.

6. The method in according to claim 1, wherein after the recognition of the recognition features, corresponding images are deposited or stored, which are called up and displayed by appropriate selection and movement of the mouse at the display element.

7. A method for processing, in particular cutting, a graphic located on a workpiece, in particular a graphic region, comprising the following steps:
    Production and/or loading of a processing job with a graphic or a graphic region respectively, and recognition features on a display element, in particular a computer;
    Application of the recognition features and of the graphic or the graphic region respectively on the workpiece;
    Arrangement of the workpiece in a processing region of a processing device, in particular of a laser plotter with an optics unit for the acquisition of the recognition features;
    Acquisition or detection of the workpiece, in particular of the recognition features, in order to determine the position and alignment of the workpiece, in particular of the applied graphic or graphic region respectively, in the processing region; and
    Carrying out the processing after successful identification of the workpiece, in particular of the graphic or graphic region respectively wherein, after the ending of the processing, the workpiece is removed from the processing region, and, as appropriate, a new workpiece is laid in, whereupon, by activation of an input means at the laser plotter or automatically by closure of a protective cover for the processing region at the laser plotter, a new processing process is started.

8. The method according to claim 7, wherein a laser actuation is not released until after recognition of a minimum number of recognition features, in particular of a register mark and/or a graphic element and/or a workpiece element, and only with the presence of adequately valid positions.

9. A method for processing, in particular cutting, a graphic located on a workpiece, in particular a graphic region, comprising the following steps:
Production or loading of a processing job with a graphic or a graphic region respectively, and recognition features on a display element, in particular a computer;
Application of the recognition features and of the graphic or the graphic region respectively on the workpiece;
Arrangement of the workpiece in a processing region of a processing device, in particular of a laser plotter with an optics unit for the acquisition of the recognition features;
Acquisition or detection of the workpiece, in particular of the recognition features, in order to determine the position and alignment of the workpiece, in particular of the applied graphic or graphic region respectively, in the processing region; and
Carrying out the processing process after successful identification of the workpiece, in particular of the graphic or graphic region respectively, wherein
after the preparation of the processing job and before the start of the acquisition or detection of the workpiece, an analysis process is carried out to determine the course of the recognition features which are to be sequentially interrogated;
wherein the graphic or the graphic region respectively is divided into four sectors;
wherein, as the first recognition feature to be interrogated, a recognition feature is detected and defined in the first sector;
whereupon a second recognition feature to be interrogated is detected and defined in a diagonal sector;
and thereafter the further recognition features are detected and defined, preferably always those recognition features with the shortest movement path of the laser.

10. The method according to claim 9, wherein a sector is selected which is closest to the starting position or a stopping position of the laser.

11. The method according to claim 9, wherein a recognition feature is detected in the first sector which is located closest to the starting position of the focusing unit.

12. The method according to claim 9, wherein as the second recognition feature, that recognition feature is detected in the second sector which is most closely located to the starting position of the focusing unit or to the first recognition feature selected.

13. A method for the processing, in particular cutting, of a graphic located on a workpiece, in particular a graphic region, comprising the following steps:
Production or loading of a processing job with a graphic or a graphic region respectively, and recognition features on a display element, in particular a computer;
Application of the recognition features and of the graphic or the graphic region respectively on the workpiece;
Arrangement of the workpiece in a processing region of a processing device, in particular of a laser plotter with an optics unit for the acquisition of the recognition features;
Acquisition or detection of the workpiece, in particular of the recognition features, in order to determine the position and alignment of the workpiece, in particular of the applied graphic or graphic region respectively, in the processing region;
Carrying out the processing process after successful identification of the workpiece, in particular of the graphic or graphic region respectively, wherein after the processing, the actually identified positions of the recognition features, or the graphic or graphic region respectively which belong to them, are displayed in the working area on the computer at the corresponding position.

14. The method according to claim 13, wherein the new location is represented on the display element flashing or in a changed color or inversely.

15. A method according to claim 13, wherein on the display element or on the laser plotter, a message is displayed for the correction of the new location or position of the graphic or graphic region respectively, such that, on confirmation, the new location is corrected for the next processing process.

16. The method according with to claim 13, wherein, in the event of a manual correction during the processing on the laser plotter for the detection of the first recognition feature, the position defined at the display element in the working area is compared with the actual position in the processing area of the laser plotter.

17. A device for carrying out the method according to claim 1, comprising at least one laser plotter, a display element connected to the laser plotter, wherein the laser plotter comprises at least one processing area for the positioning of a workpiece, at least one laser with a corresponding deflection element and a movable focusing unit and a control unit for controlling the individual elements, and the control unit is formed for the reception of data produced at the display element, in particular a graphic, wherein on the display element or display monitor arranged at the laser plotter, a working area is represented, with a laser position corresponding to the processing area and the position of the laser, in particular of the focusing unit, and that one or more same or different processing jobs can be loaded with a graphic or a graphic region respectively and recognition features, and the graphic or graphic region respectively are formed such as to be moveable with the recognition features at the working area being displayed, such that the graphic or the graphic region respectively can be adjusted to the laser position, or the laser position can be adjusted to the graphic or the graphic region respectively.

18. The device according to claim 17, wherein one or more recognition features are formed by register marks or graphic elements or workpiece elements.

19. A method for the engraving, marking, inscription and/or cutting of workpieces with applied graphic, in particular a graphic region, comprising the following steps:
Production and/or loading of a processing job with a graphic or graphic region respectively and recognition features, on a display element, in particular a computer;
Application of the recognition features and of the graphic or the graphic region respectively on the workpiece;
Arrangement of the workpiece in a processing area of a processing device, in particular a laser plotter with an optics unit for the acquisition of the recognition features;
Acquisition or detection of the workpiece, in particular of the recognition features, in order to determine the position and alignment of the workpiece, in particular of the applied graphic or of the graphic region respectively, in the processing area;
Carrying out the processing process after successful recognition of the workpiece, in particular of the graphic or graphic region respectively, wherein as a function of the recognition features, an engraving or inscription area is determined and stored, or that, as a function of the graphic or of the graphic region respectively, an engraving or inscription area is determined and stored, whereupon, during the processing process, after the acquisition of one or more recognition features, in particular of register marks, or graphic elements or, respectively, a part of the graphic or workpiece elements, a position is identified of the engraving or processing area allocated to the recognition features.

20. The method according to claim 19, wherein on the basis of the location or alignment detected of the graphic or the graphic region respectively or of the workpiece, it is determined whether an engraving or inscription, in particular an engraving process, is possible in the defined engraving area or not.

21. The method according to claim 20, wherein on the display element, in particular on the computer, or in a databank or, respectively, the control unit of the laser plotter, parameters are stored, such as, for example, engraving angle deviation, alignment angle deviation, engraving depth, engraving width, etc. for the deviation from the optimum preferably horizontal and/or vertical alignment of the graphic or, respectively, of the graphic region and/or of the workpiece.

22. The method according to claim 19, wherein after the laying of the workpiece in the processing area, a laser-pointer of the laser is positioned onto any register mark, whereupon a processing image, represented on a display element, of the graphic or of the graphic region is moved, with the recognition features belonging to it, on the display element in such a way that a laser position displayed at the display element coincides with the recognition feature marked by the laser pointer.

23. The method according to claim 19, wherein after the production of the processing job and before the start of the acquisition or detection of the workpiece, an analysis process is carried out in order to determine the sequence of the recognition features which are to be interrogated in sequence, wherein the graphic or graphic region respectively is divided into several sectors, in particular into four sectors, wherein, as the first to be interrogated, a register mark in the first sector is acquired and determined, whereupon a second register mark to be interrogated is acquired and determined in a further sector, in particular in the diagonal sector, and thereafter the further register marks acquired and determined one after another are preferably always that register mark with the shortest movement path of the laser.

24. The method according to claim 19, wherein after the ending of the processing process, the workpiece is removed from the processing area and, as appropriate, a new workpiece is inserted, whereupon, by activation of an input means at the laser plotter or automatically by closure of a protective cover for the processing area at the laser plotter, a new processing process is started.

25. The method according to claim 19, wherein after the processing process, the actual recognition position of the recognition features, and/or the graphic or graphic region respectively belonging to them, is displayed in the working area at the work device at the corresponding position.

* * * * *